United States Patent [19]
Isaak et al.

[11] Patent Number: 5,923,106
[45] Date of Patent: Jul. 13, 1999

[54] INTEGRATED FUEL CELL ELECTRIC MOTOR WITH STATIC FUEL CELL AND ROTATING MAGNETS

[76] Inventors: Mark Frank Isaak, 242 First Ave, Cultus Lake, Canada, V2R 4Y9; Daniel Molleker, 19511 First Ave. SE., Bothell, Wash. 98102

[21] Appl. No.: 09/105,141

[22] Filed: Jun. 26, 1998

[51] Int. Cl.⁶ .................................................. H02K 7/00
[52] U.S. Cl. ............................ 310/67 R; 310/268; 310/1; 310/40 MM
[58] Field of Search ............................... 310/268, 67 R, 310/156, 168, 1, 40 MM

[56] References Cited

U.S. PATENT DOCUMENTS

| | | | |
|---|---|---|---|
| 4,957,107 | 9/1990 | Sipin | 128/204.21 |
| 5,780,947 | 7/1998 | Fukuoka et al. | 310/80 |
| 5,796,188 | 8/1998 | Bays | 310/50 |

*Primary Examiner*—Nestor Ramirez
*Assistant Examiner*—Thanh Lam
*Attorney, Agent, or Firm*—Oyen Wiggs Green & Mutala

[57] ABSTRACT

This invention relates to a novel design of electric motor wherein a stationary fuel cell with an electrical output is integrated with a cylindrical type monopole (homopole) electric DC motor. Power is supplied to an output shaft by the introduction of reactants to the fuel cell. The fuel cell is positioned within the hollow cylindrical stator. The stator and fuel cell are stationary. The rotor is a hollow cylinder and is positioned to rotate about the exterior of the stator. The rotor has magnets distributed around the interior of the rotor. This novel compact combination of a fuel cell and a cylindrical form of monopole (homopole) electrical DC motor enables the combination to fit within a confined space.

3 Claims, 1 Drawing Sheet

INTEGRATED FUEL CELL ELECTRIC MOTOR WITH STATIC FUEL CELL AND ROTATING MAGNETS

SUMMARY

A fuel cell with an electrical output is integrated within a cylindrical form monopole (homopole) electric motor. Power is supplied to an output shaft by the introduction of the fuel cell reactants to the invention. The fuel cell is placed within the stator of the monopole (homopole) motor. The combination of the fuel cell and motor allows the fuel cell/motor combination to fit within a smaller space than that accorded to two separate elements.

Mating the direct current output of the electrical fuel cell to a monopole (homopole) motor eliminates the requirement for electrical brushes. The use of a monopole (homopole) motor also allows for the matching of the output characteristics of the electrical fuel cell to its load without the requirement for boosting voltage to increase electrical efficiency. The invention does not specify the type of fuel cell to be used.

A radially magnetized cylindrical form monopole electrical motor is configured with the stator within the rotor. The rotor has permanent magnets attached to affect the magnetic field required. An electrical fuel cell is placed within the stator. The electrical output of the fuel cell is applied to the stator of the monopole motor. The rotor with the magnets attached then rotates. Mechanical power is taken off the output shaft of the monopole motor. This arrangement eliminates the requirement for electrical brushes.

The combination may be characterized as one steel cup with another. The closed ends are at the top. A mechanical output shaft extends from the centre of the outer cup and pierces a cover used to support a bearing. The bottom of the inner cup is attached to a mounting plate. The bottom of the outer cup has a bearing attaching it to the mounting plate. The outer cup is then free to rotate with respect to the inner cup. The inner cylindrical portion of the outer cup is lined with magnets. The outer cylindrical portion of the inner cup is plated with copper or another good conductor. The closed end of the inner cup is electrically insulated from the cylindrical portion of the inner cup.

An electrical fuel cell is placed within the inner cup. The requirements of the fuel cell for reactants or cooling are supplied from the bottom of the inner cylinder. The positive and negative electrical power leads from the fuel cell are applied to the top and bottom of the high conductivity outer portion of the inner cup. The electrical current acts at right angles to the magnetic field from the magnets of the outer cup and axial rotation of the inner cup results.

DESCRIPTION OF DRAWING

The drawing is an elevation section through the cylindrical body of the invention. The external aspect of the invention is a closed ends cylinder with a drive shaft exiting from one end of the cylinder and the fuel and cooling connections required by the fuel cell from the other.

DESCRIPTION

Figure 1:
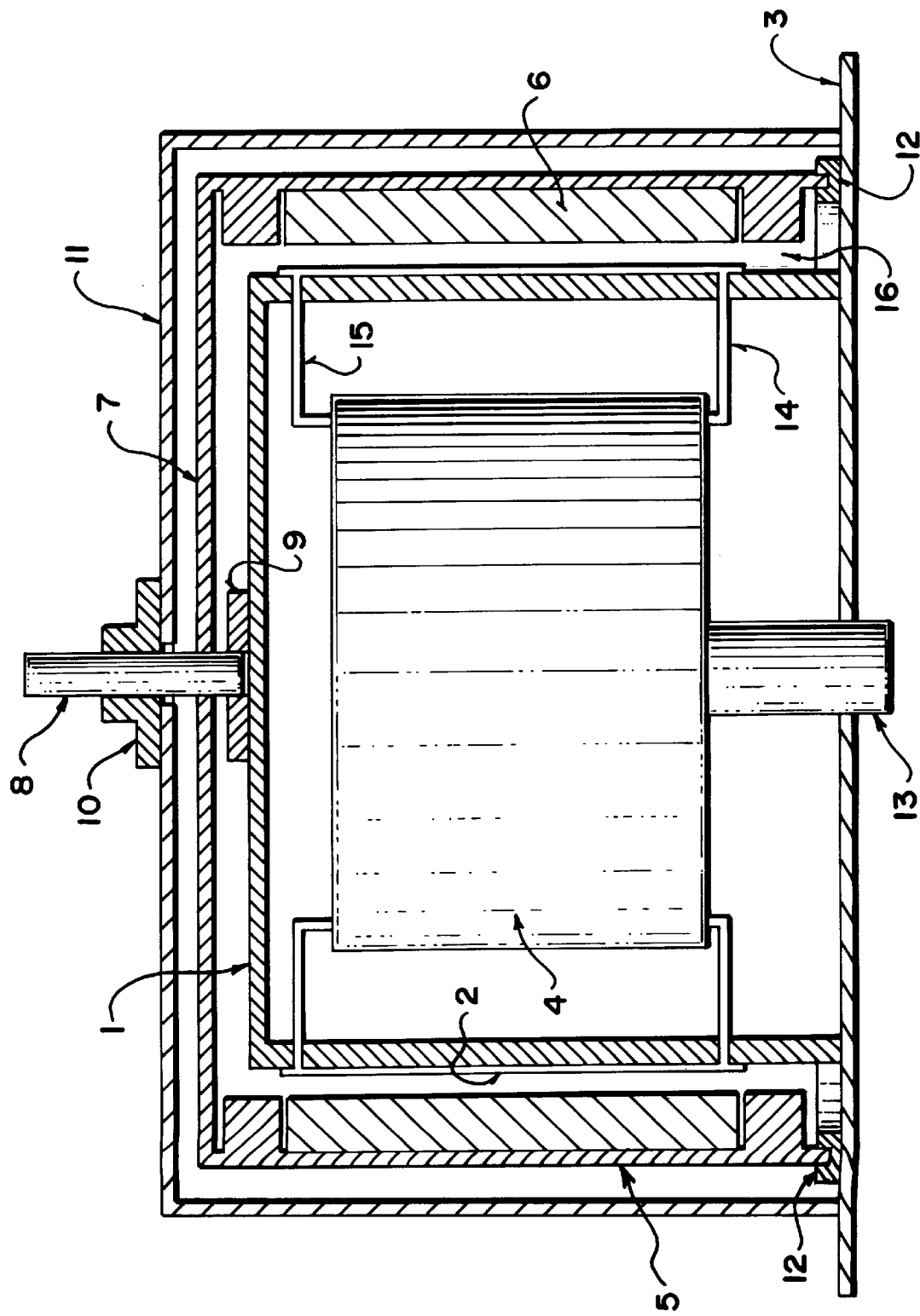

The invention is a monopole (homopole) electric motor combined with an electrical fuel cell.

The main body (1) (stator) is an inverted cup whose cylindrical portion is constructed of steel or other ferromagnetic material. The top of the main body is electrically insulated from the cylindrical portion of the main body. The main body has a band (2) made of copper or other high conductivity material inlaid on its outer circumference. The main body is attached to the mounting plate (3) which also forms the bottom of the motor. A fuel cell (4) of any description sits within the main body. The rotor (5) is another cylinder placed externally to the main body and concentric with it. The rotor may also be characterized as an inverted cup. The cylindrical portion of the rotor is constructed of steel or other ferromagnetic material. The inside circumference of the rotor has a band of permanent magnets (6) inlaid within its inner circumference. The top of the rotor (7) is attached to the output shaft (8). The rotor and shaft are supported by a bearing (9) attached to the top of the main body, a bearing attached to the cover (10) and another bearing (11) at its bottom circumference. These bearings allow the rotor to rotate with respect to the main body.

The requirements of the fuel cell for reactants and cooling (13) are affected through the mounting plate. In the instance of a fuel cell using atmospheric oxygen, the fuel cell has access to the atmosphere through holes in the cover, top of the rotor and top of the main body.

The fuel cell reaction causes a direct electrical current to flow from the positive leads (14) attached in a circular array to one linear end of the copper band to the negative leads (15) attached in a circular array to the other linear end of the copper band. A magnetic field exists in the gap (16) between the main body and the rotor. The magnetic circuit goes from the magnet across the gap, through the conductor to the cylindrical portion of the rotor, back across the gap to the cylindrical portion of the main body and back to the magnet. The action of the current at right angles to the magnetic field is to produce a force perpendicular to both axes causing the rotor to rotate and therefore the output shaft.

The integrated fuel cell motor may be mounted in any orientation according to the restrictions afforded by the fuel cell used.

What is claimed is:

1. An integrated fuel cell-electric motor comprising:
   (a) a cylindrical homopole motor constructed of:
      (i) A hollow cylindrical casing;
      (ii) a hollow cylindrical magnetically permeable rotor with an axis therethrough rotationally mounted within the casing;
      (iii) a magnet with consistent magnetization distributed around the interior of the circumferential wall of the hollow cylindrical rotor; and
      (iv) a hollow cylindrical electroconducting stator axially mounted within the hollow of the cylindrical rotor; said stator being electrically insulated from the cylindrical rotor; and
   (b) an electrical fuel cell mounted within the hollow of the stator.

2. A motor as claimed in claim 1 wherein the rotor is an inverted cup, the stator is an inverted cup of a diameter smaller than the diameter of the rotor; and the rotor is connected to a shaft which is positioned at the axis of the rotor and enables the rotor to axially rotate within the interior of the casing.

3. A motor as claimed in claim 2 including an electroconductive material coated on the circumferential exterior of the stator.

* * * * *